(No Model.)

W. J. BROADBENT.
SAFETY PIN.

No. 297,224.        Patented Apr. 22, 1884.

Attest:
Raymond H. Barnes.
W. E. Shaffer.

Inventor:
William J. Broadbent
By Parker W. Page
att.

UNITED STATES PATENT OFFICE.

WILLIAM J. BROADBENT, OF BELLEVILLE, NEW JERSEY.

SAFETY-PIN.

SPECIFICATION forming part of Letters Patent No. 297,224, dated April 22, 1884.

Application filed May 19, 1883. (No model.)

*To all whom it may concern:*

Be it known that I, WILLIAM J. BROADBENT, a citizen of the United States, and a resident of Belleville, in the county of Essex and the State of New Jersey, have invented certain new and useful Improvements in Safety-Pins, of which the following is a specification.

Figure 1:
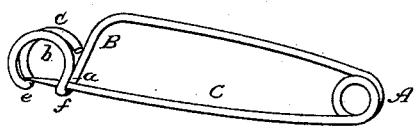

My invention relates to shield or safety pins. Heretofore, so far as I am informed, safety-pins have been made wholly and partially of wire, the point having been received between and shielded by portion of the wire bent up to form two rings or coils, between which the point rests when the pin is locked. It has also been customary to form them as shown in Figure 1 of the accompanying drawings, which will be more fully hereinafter described. Safety-pins of this peculiar construction are objectionable on many accounts.

The object of this invention is to overcome these objections and furnish a safety-pin of such conformation that the point of the same shall be better protected than in the pins commonly used, so that it will be less likely to catch in the material with which it is used. To this end I form a pin from resilient wire by successive or simultaneous bending in such manner that the catch will be formed with two rings or coils, one on each side, or both on one side of the body of the pin, and a connecting portion with which the pin engages when locked, so that its point will lie between the two rings or coils, and thus be properly protected.

Figure 2:
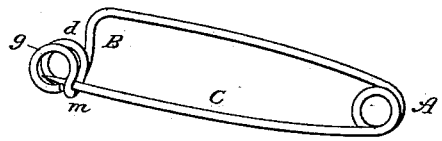
Figure 3:
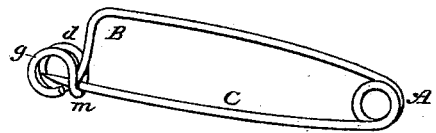

In the accompanying drawings I have illustrated, in Fig. 1, an ordinary form of safety-pin now almost universally used. Fig. 2 is a perspective view of a pin made in accordance with my invention, which is more particularly designed as an improvement on the form shown in Fig. 1. Fig. 3 is a modification of my improved pin.

Referring to Fig. 1, the pin shown is formed by bending around a brass, steel, or other wire, pointed at one end, forming a spring, A. The part B, near its end, is then bent at right angles and toward the part C. It is then bent back upon itself, forming the part $a$, then bent over into a loop, $b$, then bent upon itself in a similar loop, $c$. The part C has a tendency to spring away from the catch thus formed, and when the point is pressed into the catch it is held in place by resting on one or both points $e\ f$. Pins thus made, however, are objectionable, from the fact that unless made with the greatest care the point is left unprotected. The cloth with which they are used is apt to enter the space under the loop and catch over the point, so that it is often torn or injured when the pin is removed. In order to avoid this, I form the pin as shown in Fig. 2. I first take a piece of wire of suitable length, and bend it around upon itself, forming a spring, A. I then bend the part B near its end at right angles, and toward the part C. I then bend it around to form a complete ring or coil, $d$, then bend it at right angles away from the ring already formed, forming a U-shaped bearing, $m$, for the part C, and I then form another ring, $g$, in a plane parallel to that of the ring $d$, as illustrated in the drawings. When the part C is bent up and pressed into the space between the rings or coils $d\ g$, it rests upon the U-shaped bearing or part $m$, and is locked thereby in position. It will thus be seen that its point lies between the two rings, thereby being so fully protected that there is no longer any liability of its catching in or tearing the material with which it is used.

Instead of forming both rings or coils $d\ g$ on one side of the part B, the first may be formed on one side, as shown in Fig. 3, the wire then bent over, so that the part $m$ crosses to the other side of part B, and the second ring then formed.

The pins may be bent or formed by hand or suitable mechanism adapted for the purpose, and may be made of brass, steel, or any other suitable metal.

What I claim as of my own invention, and desire to secure by Letters Patent, is as follows:

1. A safety-pin having a catch composed of two rings or coils, and a connecting portion, substantially as described, forming a bearing or rest on the rear of the coil for the pin when locked, and so formed that the point of the pin, when locked, will lie between two rings and be protected thereby, as set forth.

2. In a safety-pin, the combination of the part B, bent at right angles near its end, and then bent into two rings or coils side by side, and with the connecting bearing or rest $m$ on the rear of the coil, a spring, A, and a pointed portion, C, adapted to be received between the said rings and locked in position by the bearing or rest $m$, as described.

In testimony whereof I have hereunto set my hand this 15th day of May, 1883.

WILLIAM J. BROADBENT.

Witnesses:
W. FRISBY,
W. H. HARTLEY.